US012117921B2

(12) United States Patent
Griffin et al.

(10) Patent No.: US 12,117,921 B2
(45) Date of Patent: Oct. 15, 2024

(54) PERFORMING COMPARATIVE TESTING OF QUANTUM SERVICES

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 749 days.

(21) Appl. No.: 17/243,755

(22) Filed: Apr. 29, 2021

(65) Prior Publication Data

US 2022/0350726 A1    Nov. 3, 2022

(51) Int. Cl.
*G06F 11/36*    (2006.01)

(52) U.S. Cl.
CPC .................. *G06F 11/3612* (2013.01)

(58) Field of Classification Search
CPC ....................................................... G06F 11/36
See application file for complete search history.

(56) References Cited

U.S. PATENT DOCUMENTS

| | | | |
|---|---|---|---|
| 9,660,859 | B1 | 5/2017 | Dadashikelayeh et al. |
| 9,978,020 | B1 | 5/2018 | Gambetta et al. |
| 10,614,370 | B2 | 4/2020 | Johnson et al. |
| 2019/0180197 | A1* | 6/2019 | Granade ............... G06N 10/00 |
| 2021/0157662 | A1* | 5/2021 | Heckey ................. G06F 9/5072 |
| 2021/0182071 | A1* | 6/2021 | Khammassi .......... G06F 1/0328 |
| 2022/0300849 | A1* | 9/2022 | Tannu ................... G06N 10/40 |

FOREIGN PATENT DOCUMENTS

| | | |
|---|---|---|
| WO | 2016089711 A1 | 6/2016 |
| WO | 2017189052 A1 | 11/2017 |

OTHER PUBLICATIONS

Louriz, Riahi, "Highlighting Quantum Computing for Machine Learning," https://medium.com/meetech/highlighting-quantum-computing-for-machine-learning-1f1abd41cb59, Sep. 25, 2019, 12 pages.
Streif, Michael, et al., "Training the Quantum Approximate Optimization Algorithm without access to a Quantum Processing Unit," Quantum Science and Technology, vol. 5, No. 3, Aug. 23, 2019, 20 pages.

\* cited by examiner

*Primary Examiner* — Jae U Jeon
(74) *Attorney, Agent, or Firm* — Dority & Manning, P.A.

(57) ABSTRACT

Performing comparative testing of quantum services is disclosed. In one example, a processor device of a quantum computing system (e.g., by executing a quantum testing service (QTS)) receives a first request for testing from a requestor, wherein the first request comprises an identifier of a quantum service. The quantum computing device retrieves a plurality of quantum service definitions corresponding to a plurality of different versions of the quantum service, based on the first request. A plurality of instances of the quantum service are then instantiated for parallel execution by the quantum computing device, wherein each instance is defined by a quantum service definition of the plurality of quantum service definitions. The quantum computing device next performs testing of each instance of the plurality of instances, based on the first request, and generates a testing result report based on the testing.

20 Claims, 7 Drawing Sheets

PERFORMING COMPARATIVE TESTING OF QUANTUM SERVICES

BACKGROUND

Quantum computing involves the use of quantum bits, referred to herein as "qubits," which have characteristics that differ from those of classical (i.e., non-quantum) bits used in classical computing. As quantum computing continues to increase in popularity and become more commonplace, an ability to perform comparative testing of performance characteristics of different versions of quantum services will be desirable.

SUMMARY

The examples disclosed herein implement a quantum testing service (QTS) that enables comparative testing of quantum services by retrieving multiple quantum service definitions for different versions of a quantum service, instantiating multiple instances of the quantum service for parallel execution based on the quantum service definitions, and performing testing of each instance of the quantum service. In this manner, performance metrics for the different versions of the quantum service may be obtained and compared.

In one example, a method for performing comparative testing of quantum services is disclosed. The method comprises receiving, by a quantum computing device, a first request for testing from a requestor, wherein the first request comprises an identifier of a quantum service. The method further comprises retrieving, by the quantum computing device, a plurality of quantum service definitions corresponding to a plurality of different versions of the quantum service, based on the first request. The method also comprises instantiating a plurality of instances of the quantum service for parallel execution by the quantum computing device, wherein each instance is defined by a quantum service definition of the plurality of quantum service definitions. The method additionally comprises performing testing of each instance of the plurality of instances, based on the first request. The method further comprises generating a testing result report based on the testing.

In another example, a computing system for performing comparative testing of quantum services is disclosed. The computing system comprises a quantum computing device that comprises a system memory, and a processor device coupled to the system memory. The processor device is to receive a first request for testing from a requestor, wherein the first request comprises an identifier of a quantum service. The processor device is further to retrieve a plurality of quantum service definitions corresponding to a plurality of different versions of the quantum service, based on the first request. The processor device is also to instantiate a plurality of instances of the quantum service for parallel execution by the quantum computing device, wherein each instance is defined by a quantum service definition of the plurality of quantum service definitions. The processor device is additionally to perform testing of each instance of the plurality of instances, based on the first request. The processor device is further to generate a testing result report based on the testing.

In another example, a non-transitory computer-readable medium is provided. The non-transitory computer-readable medium stores thereon computer-executable instructions which, when executed, cause one or more processor devices to receive a first request for testing from a requestor, wherein the first request comprises an identifier of a quantum service. The computer-executable instructions further cause the one or more processor devices to retrieve a plurality of quantum service definitions corresponding to a plurality of different versions of the quantum service, based on the first request. The computer-executable instructions also cause the one or more processor devices to instantiate a plurality of instances of the quantum service for parallel execution by a quantum computing device, wherein each instance is defined by a quantum service definition of the plurality of quantum service definitions. The computer-executable instructions additionally cause the one or more processor devices to perform testing of each instance of the plurality of instances, based on the first request. The computer-executable instructions further cause the one or more processor devices to generate a testing result report based on the testing.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first request" and "second request," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. As quantum computing continues to increase in popularity and become more commonplace, an ability to perform comparative testing of performance characteristics of different versions of quantum services will be desirable.

The examples disclosed herein implement a quantum testing service (QTS) that enables comparative testing of quantum services by retrieving multiple quantum service definitions for different versions of a quantum service, instantiating multiple instances of the quantum service for parallel execution based on the quantum service definitions, and performing testing of each instance of the quantum service. As used herein, the term "quantum service" and derivatives thereof refer to a process that executes on a quantum computing device, and that accesses one or more qubits to provide a desired functionality. The term "comparative testing" and derivatives thereof are used herein to refer to a testing methodology in which the performance of two or more versions of a quantum service are evaluated and compared by the QTS. Comparative testing of multiple versions of quantum services is analogous to "A/B testing" or "bucket testing" methodologies that may performed to evaluate modifications to user interfaces (UIs).

To perform comparative testing, a QTS executing on a quantum computing device receives a request for testing from a requestor (e.g., a process running on the quantum computing device, a process running on a different quantum computing device or on a classical computing device, or a user of the quantum computing device, as non-limiting examples). The request includes an identifier of a quantum service for which the comparative testing is to be performed, and in some examples may include additional data such as a retrieval indicator that indicates a count of quantum service definitions to retrieve, an indication of how many instances of the quantum service to instantiate, and/or parameters for testing and load balancing among the instances. The term "instantiate" and derivatives are used herein to refer to operations for beginning execution of a quantum service based on a corresponding quantum service definition.

Based on the request, the QTS next retrieves a plurality of quantum service definitions, each of which defines a different version of the quantum service. The different versions of the quantum service may represent, for example, different stages of development of the quantum service or alternate implementations of the quantum service. In some examples, each of the quantum service definitions may comprise a Quantum Assembly Language (QASM) file that provides quantum programming instructions that define a corresponding version of the quantum service. The plurality of quantum service definitions in some examples may be retrieved from a repository such as a GitHub repository, as a non-limiting example.

In some examples, the QTS may determine how many instances of the quantum service that the quantum computing device is capable of instantiating, based on the plurality of quantum service definitions. For instance, the QTS may use data indicating available hardware resources of the quantum computing device and/or a count of available qubits of the quantum computing device to determine how many instances of the quantum service can be instantiated by the quantum computing device. According to some examples, the QTS may transmit a response to the requestor to indicate how many instances of the quantum service can be instantiated by the quantum computing device. The QTS in such examples may subsequently receive a second request from the requestor that indicates how many instances of the quantum service that the QTS is to instantiate, based on the response.

After retrieving the plurality of quantum service definitions, the QTS uses the quantum service definitions to instantiate a plurality of instances of the quantum service for parallel execution by the quantum computing device. The QTS may access the functionality of or otherwise coordinate with other elements of the quantum computing device, such as a task manager and/or a process scheduler, in instantiating the plurality of instances. Once instantiated, the plurality of instances are executed in parallel (i.e., in a multitasking fashion) by the quantum computing device. The QTS then performs testing of each instance of the plurality of instances, based on the request. For instance, the QTS may receive, or may itself generate, a plurality of test requests directed to the quantum service and may forward each test request of the plurality of test requests to one of the instances for servicing. The QTS in such examples may subsequently obtain a measurement of a performance metric (e.g., response time, packet loss, number of serviced requests versus number of unserviced requests, error rates, and/or the like, as non-limiting examples).

The QTS then generates a testing result report based on the testing. The testing result report includes data obtained by the QTS from the testing, and, in some examples, the measurements of the performance metric for each instance of the plurality of instances. According to some examples, the QTS may transmit the testing result report to the requestor.

Figure 1:
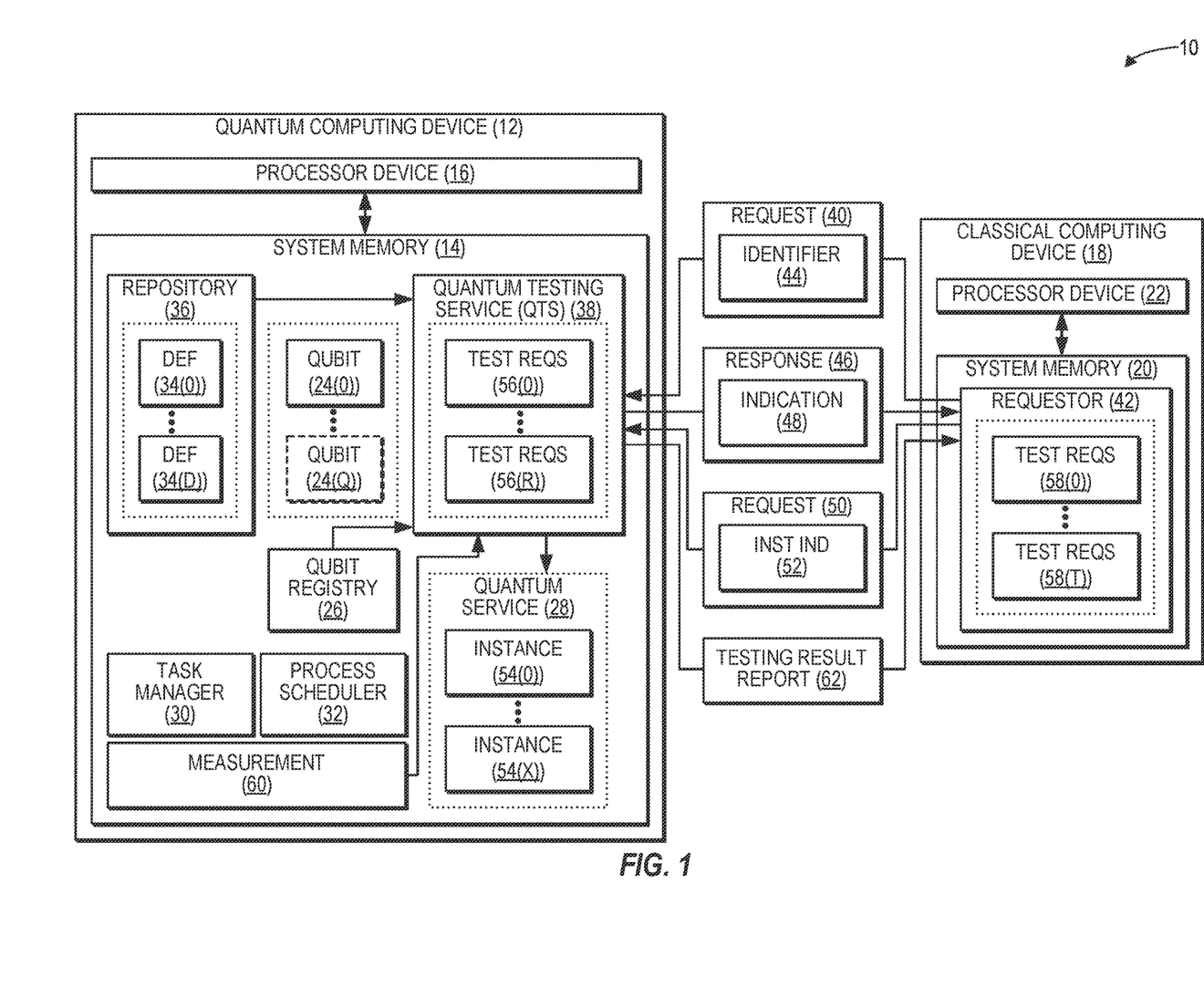
FIG. 1 is a block diagram of a quantum computing system in which examples may be practiced.

FIG. 1 is a block diagram of a quantum computing system 10 according to one example. The quantum computing system 10 includes a quantum computing device 12 that comprises a first system memory 14 and a first processor device 16, and also includes a classical computing device 18 that comprises a second system memory 20 and a second processor device 22. The quantum computing device 12 and the classical computing device 18 in FIG. 1 are communicatively coupled via a classical communications link (not shown), which may comprise a private network or a public network such as the internet. It is to be understood that the quantum computing system 10 according to some examples may include other quantum computing devices and/or classical computing devices that are not illustrated in FIG. 1. Additionally, the quantum computing device 12 and the classical computing device 18 in some examples may include constituent elements in addition to those illustrated in FIG. 1.

The quantum computing device 12 operates in quantum environments but can operate using classical computing principles or quantum computing principles. When using quantum computing principles, the quantum computing device 12 performs computations that utilize quantum-mechanical phenomena, such as superposition and/or entanglement states. The quantum computing device 12 may operate under certain environmental conditions, such as at or near zero degrees (0°) Kelvin. When using classical computing principles, the quantum computing device 12 utilizes binary digits that have a value of either zero (0) or one (1).

In the example of FIG. 1, the quantum computing device 12 implements a set of one or more qubits 24(0)-24(Q). To maintain information for the qubit(s) 24(0)-24(Q), the quantum computing device 12 includes a qubit registry 26, which comprises a plurality of qubit registry entries (not shown) each corresponding to a qubit such as the one or more qubits 24(0)-24(Q). The qubit registry 26 in some examples maintains data relating to the qubits implemented by the quantum computing device 12, such as a count of the total number of qubits implemented by the quantum computing device 12 and a count of the number of available qubits that are currently available for allocation, as non-limiting examples. Each of the qubit registry entries of the qubit registry 26 also stores qubit metadata (not shown) for a corresponding qubit. The qubit metadata may include, as non-limiting examples, an identifier of the corresponding qubit, an availability indicator that indicates whether the corresponding qubit is available for use or is in use by a specific quantum process, an identifier of a quantum process associated with the corresponding qubit, and/or an entanglement indicator that indicates whether the corresponding qubit is in an entangled state.

The quantum computing device 12 in some examples is configured to provide a quantum service 28 that employs one or more of the qubit(s) 24(0)-24(Q) maintained by the quantum computing device 12. The quantum service 28 is a process that is executed by the first processor device 16 of the quantum computing device 12 to provide a desired functionality. Execution of quantum services such as the quantum service 28 is facilitated by a task manager 30 and a process scheduler 32. The task manager 30 of the quantum computing device 12 handles operations for creating, monitoring, and terminating quantum services, while the process scheduler 32 of the quantum computing device 12 controls allocation of processing resources to executing quantum services.

In the example of FIG. 1, there exist multiple versions of the quantum service 28, each of which represents a different developmental stage and/or an alternate implementation of the quantum service 28. Each of these multiple versions of the quantum service 28 is defined by one of a corresponding plurality of quantum service definitions (captioned "DEF" in FIG. 1) 34(0)-34(D). Thus, for instance, the quantum service definition 34(0) may define an earlier version of the quantum service 28, while the quantum service definition 34(D) may define a subsequent version of the quantum service 28. The quantum service definitions 34(0)-34(D) may comprise, for example, QASM files that include quantum programming instructions defining the corresponding version of the quantum service 28. As seen in FIG. 1, the quantum service definitions 34(0)-34(D) are stored in a repository 36, which may comprise a GitHub repository, as a non-limiting example.

As discussed above, it is desirable for the quantum computing device 12 to be able to perform comparative testing of performance characteristics of different versions of the quantum service 28. For instance, in one possible use case, an organization making use of the quantum computing device 12 may need to evaluate whether a newly developed version of the quantum service 28 using a first algorithm results in improved performance relative to an earlier version of the quantum service 28 using a second algorithm. Accordingly, the quantum computing device 12 of FIG. 1 implements a QTS 38 for performing comparative testing of different versions of the quantum service 28.

In exemplary operation, the QTS 38 receives a first request 40 from a requestor 42. In the example of FIG. 1, the requestor 42 is a process executed by the second processor device 22 of the classical computing device 18. However, it is to be understood that, in some examples, the requestor 42 may be a process executing on the quantum computing device 12, a process executing on another quantum or classical computing device, or a user of the quantum computing device 12, the classical computing device 18, or another quantum or classical computing device. As seen in FIG. 1, the first request 40 comprises an identifier 44 of the quantum service 28. In some examples, the first request 40 may include additional data, such as a retrieval indicator (not shown) that indicates a count of the plurality of quantum service definitions 34(0)-34(D) to retrieve. Upon receiving the first request 40, the QTS 38 retrieves (e.g., from the repository 36) the plurality of quantum service definitions 34(0)-34(D) corresponding to a plurality of different versions of the quantum service 28. The QTS in some examples may retrieve the plurality of quantum service definitions 34(0)-34(D) based on the identifier 44 of the first request 40 (e.g., by retrieving ones of the quantum service definitions 34(0)-34(D) having an identifier that matches the identifier 44).

In some examples, the QTS 38, after receiving the first request 40, may determine a number of instances of the quantum service 28 that the quantum computing device 12 is capable of instantiating. This determination may be based on the plurality of quantum service definitions 34(0)-34(D), as well as on information relating to available hardware resources of the quantum computing device 12 and/or on a count of available qubits among the qubits 24(0)-24(Q) of the quantum computing device 12, as non-limiting examples. The QTS 38 may then transmit a response 46 to the requestor 42, where the response 46 comprises an indication 48 of the number of instances of the quantum service 28 that the quantum computing device 12 is capable of instantiating. Based on the response 46, the requestor 42 may transmit a second request 50 that includes an instance indicator (captioned "INST IND" in FIG. 1) 52 that indicates a count of instances of the quantum service 28 to instantiate. In this manner, the QTS 38 may inform the requestor 42 if the quantum computing device 12 lacks resources to instantiate every version of the quantum service 28 for which a quantum service definition 34(0)-34(D) exists, and the requestor 42 may opt to instantiate fewer instances of the quantum service 28 for testing.

The QTS 38 then instantiates a plurality of instances 54(0)-54(X) of the quantum service 28 for parallel execution by the quantum computing device 12. Each of the plurality of instances 54(0)-54(X) is defined by a corresponding quantum service definition of the plurality of quantum service definitions 34(0)-34(D) retrieved by the QTS 38. The QTS 38 according to some examples may instantiate the plurality of instances 54(0)-54(X) by accessing, invoking, or otherwise coordinating with other elements of the quantum computing device 12, such as the task manager 30 and/or the process scheduler 32. The plurality of instances 54(0)-54(X) are executed in parallel by the quantum computing device 12 such that the functionality provided by each is accessible to the QTS 38 and/or to other processes or requestors.

After instantiating the plurality of instances 54(0)-54(X) of the quantum service 28, the QTS 38 performs testing of each instance of the plurality of instances 54(0)-54(X), based on the first request 40. For instance, in some examples, the first request 40 may comprise information relating to testing to be performed on the plurality of instances 54(0)-54(X), such as one or more of the following: testing parameters (e.g., test workloads and/or expected results of testing, as non-limiting examples); load balancing parameters (e.g., random assignment of test requests to instances, round-robin assignment of test requests to instances, routing of specific types of test requests to specific instances, and/or stress testing of specific instances, as non-limiting examples); and/or performance metric indicators (e.g., indicators of performance metrics to include in results, as non-limiting examples).

Some examples may provide that the QTS 38 performs testing using a plurality of test requests directed to the quantum service 28. In some examples, the QTS 38 itself may generate a plurality of test requests (captioned "TEST REQS" in FIG. 1) 56(0)-56(R) directed to the quantum service 28, while the QTS 38 according to some examples may receive a plurality of test requests (captioned "TEST REQS" in FIG. 1) 58(0)-58(T) from the requestor 42. In either example, the QTS 38 forwards each test request of the plurality of test requests 56(0)-56(R), 58(0)-58(T) to an instance of the plurality of instances 54(0)-54(X). The QTS 38 then obtains a measurement 60 of a performance metric of the instance.

Once testing is concluded, the QTS 38 generates a testing result report 62 based on the testing. The testing result report 62 in some examples includes measurements of performance metrics, such as the measurement 60, obtained during the testing. In some examples, the QTS 38 transmits the testing result report 62 to the requestor 42.

It is to be understood that, because the QTS 38 is a component of the quantum computing device 12, functionality implemented by the QTS 38 may be attributed to the quantum computing system 10 generally. Moreover, in examples where the QTS 38 comprises software instructions that program the first processor device 16 to carry out functionality discussed herein, functionality implemented by the QTS 38 may be attributed herein to the first processor device 16. It is to be further understood that while, for purposes of illustration only, the QTS 38 is depicted as a single component, the functionality implemented by the QTS 38 may be implemented in any number of components, and the examples discussed herein are not limited to any particular number of components.

Figure 2A:
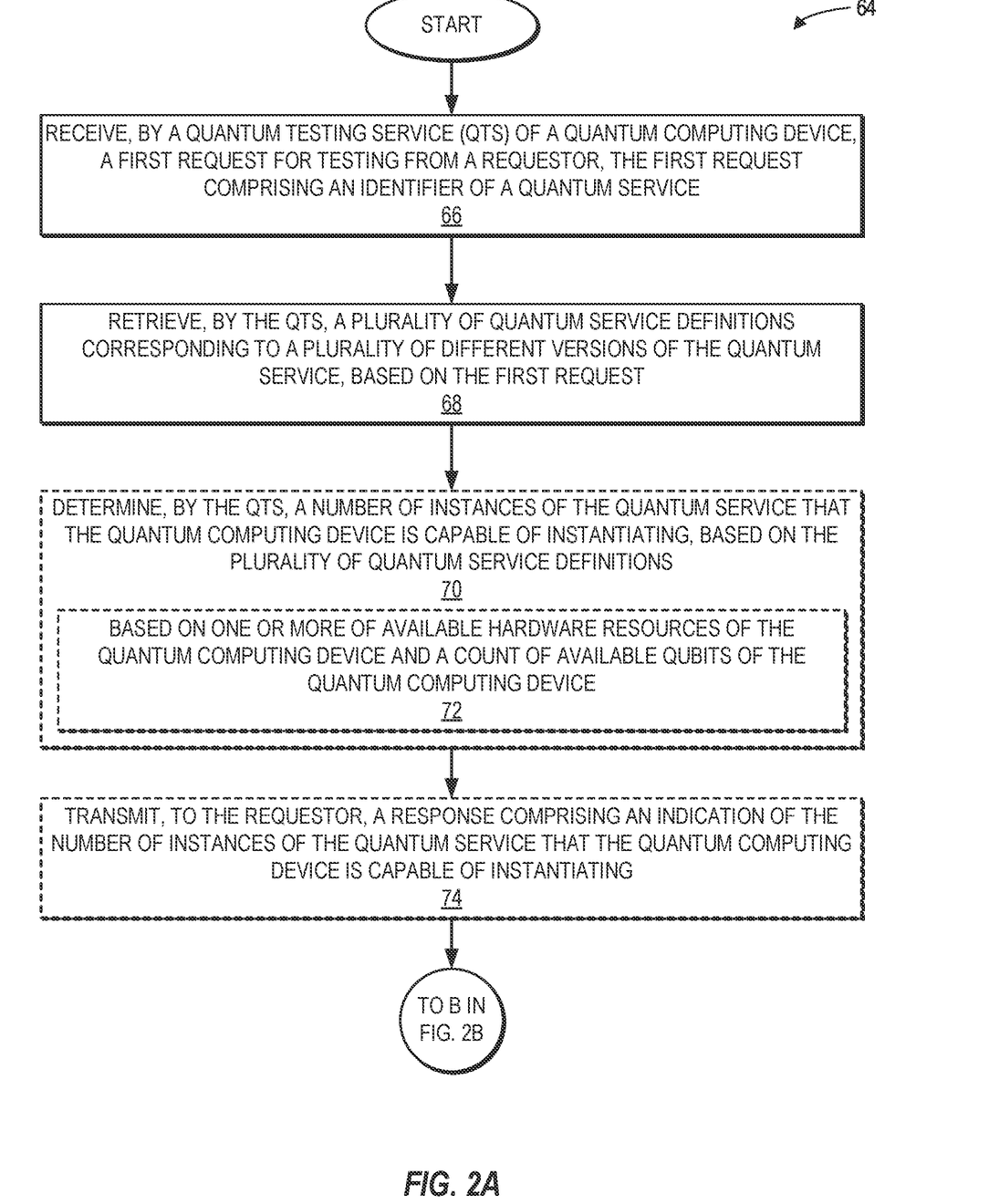
FIGS. 2A-2C are flowcharts illustrating operations performed by a quantum computing device for performing comparative testing of quantum services, according to one example.
Figure 2B:
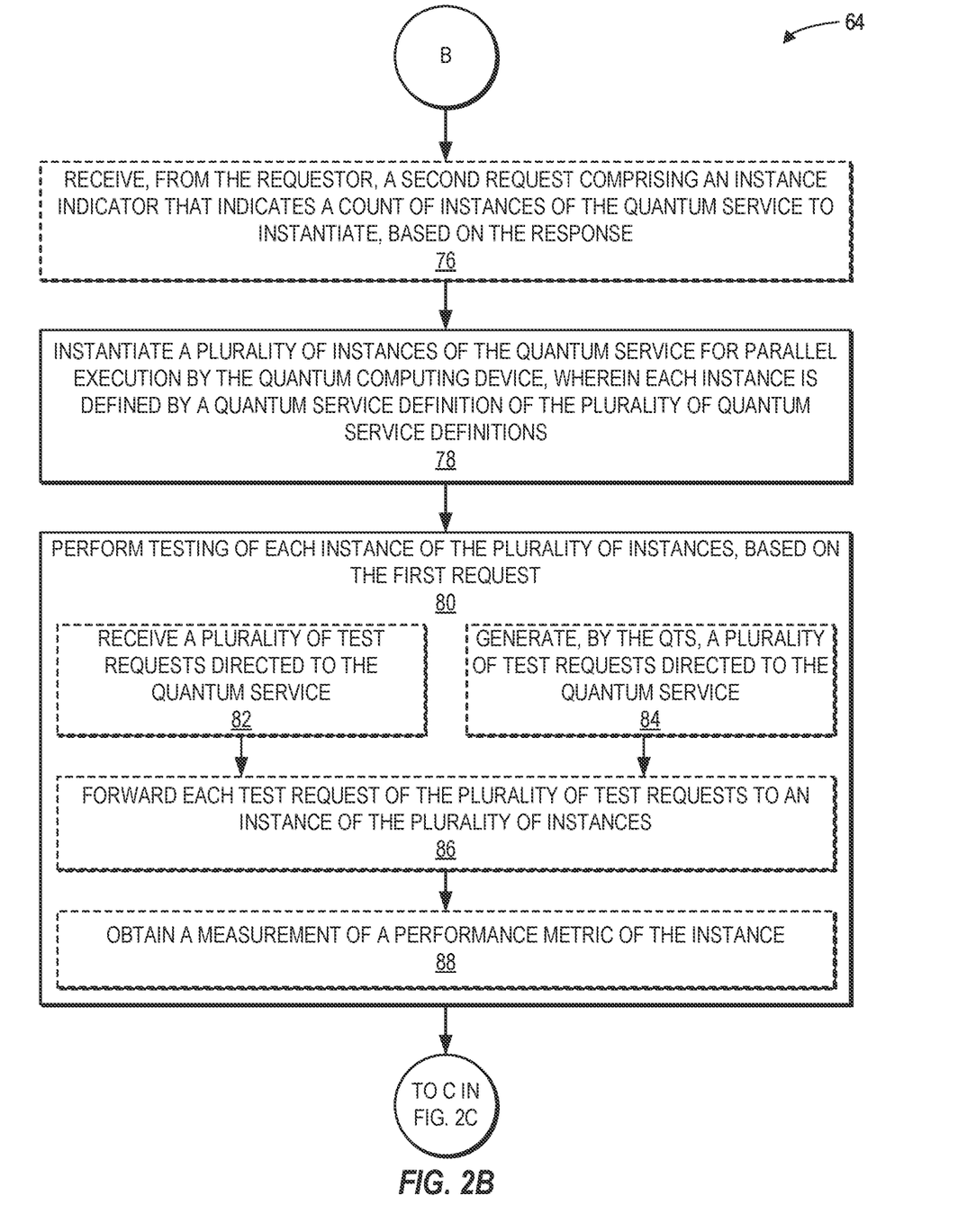
Figure 2C:
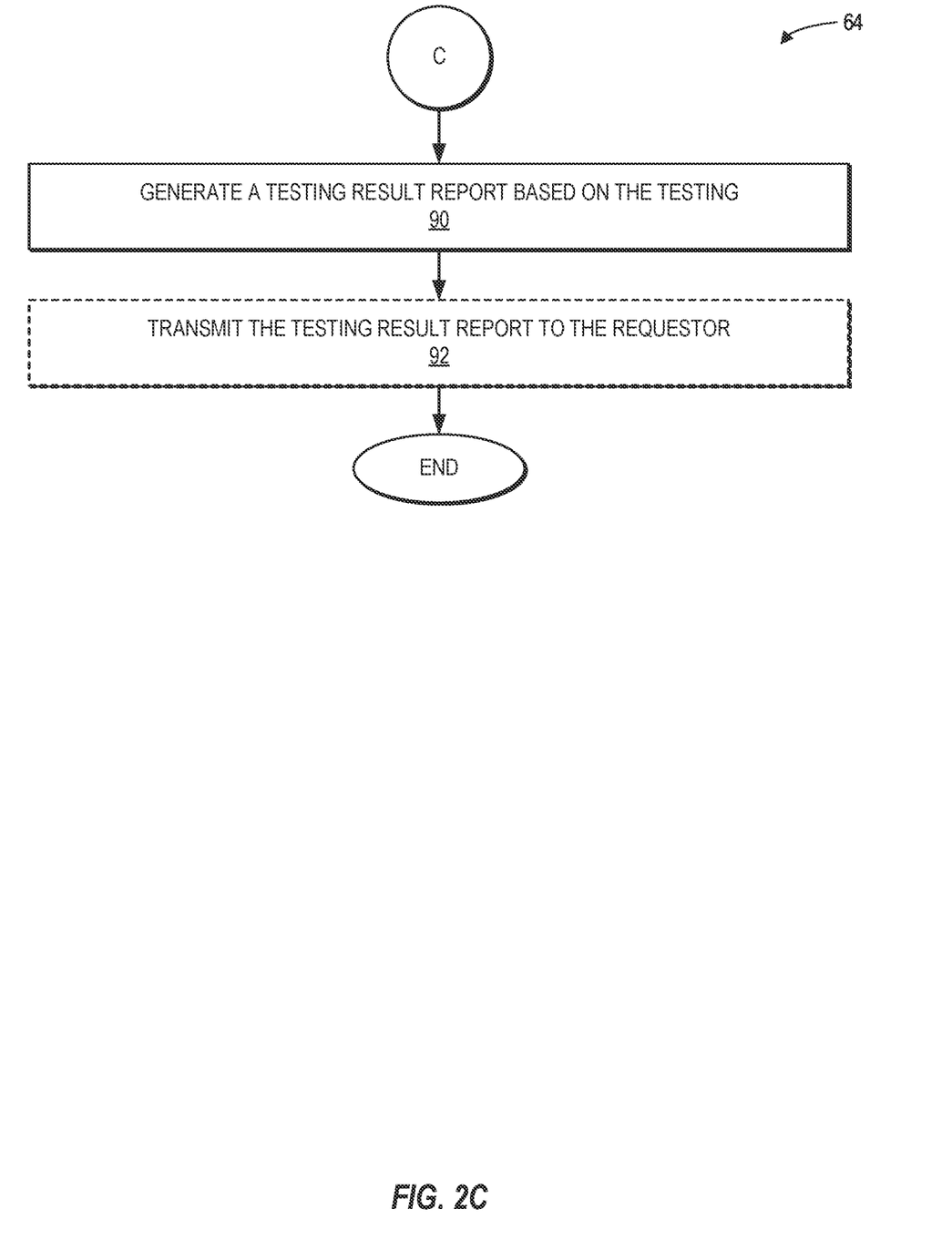

To illustrate exemplary operations performed by the quantum computing system 10 of FIG. 1 for performing comparative testing of quantum services according to one example, FIGS. 2A-2C provide a flowchart 64. Elements of FIG. 1 are referenced in describing FIGS. 2A-2C for the sake of clarity. In FIG. 2A, operations begin with the first processor device 16 of the quantum computing device 12 receiving (e.g., by executing the QTS 38) the first request 40 for testing from the requestor 42, the first request 40 comprising the identifier 44 of the quantum service 28 (block 66). The QTS 38 next retrieves the plurality of quantum service definitions 34(0)-34(D) corresponding to the plurality of different versions of the quantum service 28, based on the first request 40 (block 68). In some examples, the QTS 38 may determine a number of instances of the quantum service 28 that the quantum computing device 12 is capable of instantiating, based on the plurality of quantum service definitions 34(0)-34(D) (block 70). The operations of block 70 for determining the number of instances of the quantum service 28 that the quantum computing device 12 is capable of instantiating may be based, e.g., on one or more of available hardware resources of the quantum computing device 12 and a count of the available qubits 24(0)-24(Q) of the quantum computing device 12 (block 72). The QTS 38 may then transmit, to the requestor 42, the response 46 comprising the indication 48 of the number of instances of the quantum service 28 that the quantum computing device

12 is capable of instantiating (block 74). Operations according to some examples then continue at block 76 of FIG. 2B.

Referring now to FIG. 2B, the QTS 38 in some examples may subsequently receive, from the requestor 42, the second request 50 comprising the instance indicator 52 that indicates the count of instances of the quantum service 28 to instantiate, based on the response 46 (block 76). The QTS 38 next instantiates the plurality of instances 54(0)-54(X) of the quantum service 28 for parallel execution by the quantum computing device 12, wherein each instance is defined by a quantum service definition of the plurality of quantum service definitions 34(0)-34(D) (block 78).

The QTS 38 then performs testing of each instance of the plurality of instances 54(0)-54(X), based on the first request 40 (block 80). In some examples, operations of block 80 for performing testing of each instance of the plurality of instances 54(0)-54(X) may include the QTS 38 receiving the plurality of test requests 58(0)-58(T) directed to the quantum service 28 (e.g., from the requestor 42) (block 82). Some examples may alternatively or additionally provide that the QTS 38 itself generates the plurality of test requests 56(0)-56(R) directed to the quantum service 28 (block 84). In either example, the QTS 38 may forward each test request of the plurality of test requests 58(0)-58(T), 56(0)-56(R) to an instance of the plurality of instances 54(0)-54(X) (block 86). The QTS 38 may then obtain a measurement (such as the measurement 60 of FIG. 1) of a performance metric of the instance (block 88). Operations then continue at block 90 of FIG. 2C.

Turning now to FIG. 2C, the QTS 38 generates a testing result report (e.g., the testing result report 62 of FIG. 1) based on the testing (block 90). The QTS 38 according to some examples may then transmit the testing result report 62 to the requestor 42 (block 92).

Figure 3:
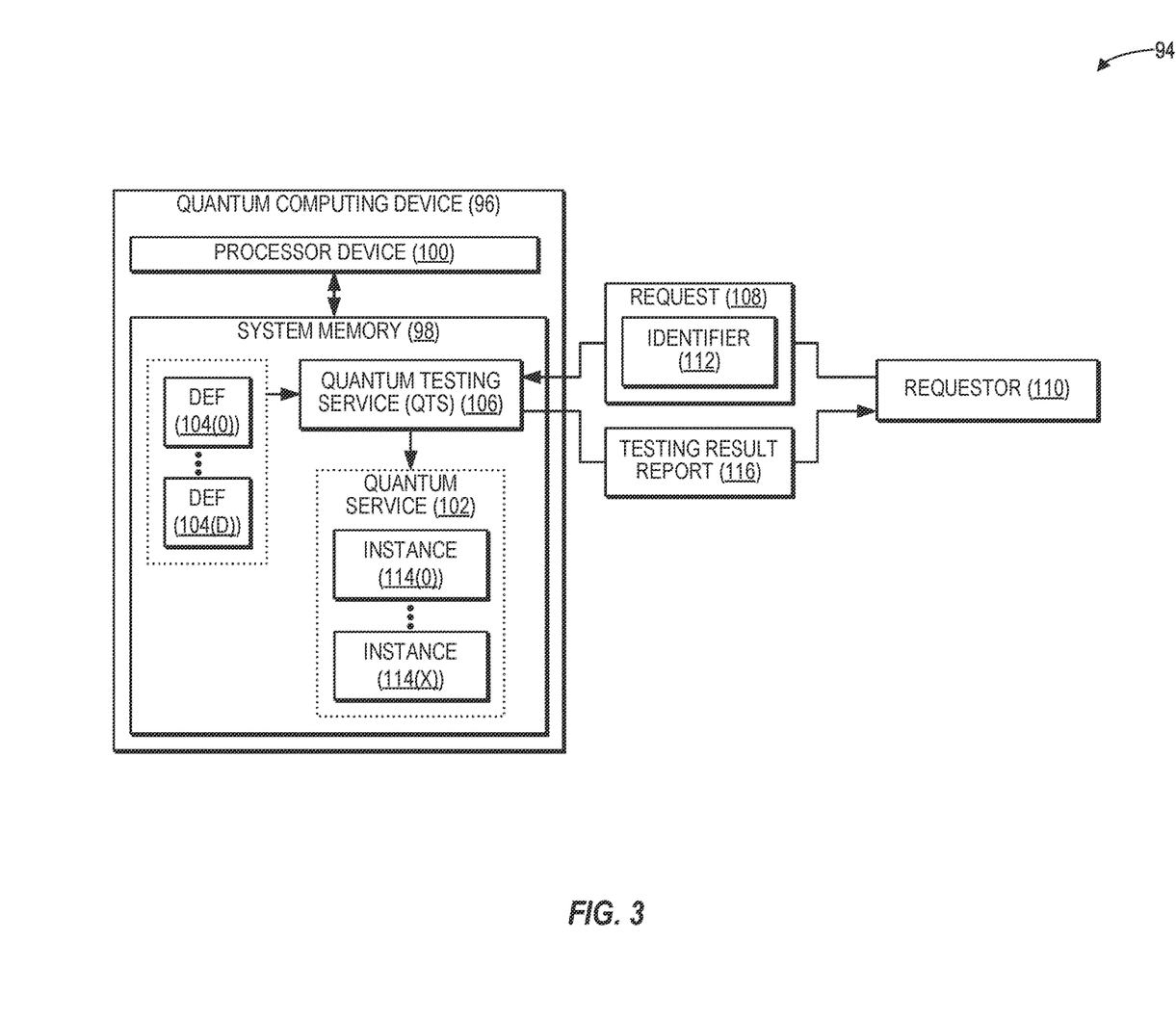
FIG. 3 is a simpler block diagram of the quantum computing device of FIG. 1 for performing comparative testing of quantum services, according to one example.

FIG. 3 is a simpler block diagram of the quantum computing system 10 of FIG. 1 for performing comparative testing of quantum services, according to one example. In the example of FIG. 3, a quantum computing system 94 includes a quantum computing device 96 that comprises a system memory 98 and a processor device 100. The quantum computing device 96 is configured to provide a quantum service 102, which is a process executed by the processor device 100 of the quantum computing device 96 to provide a desired functionality. In the example of FIG. 3, there exist multiple versions of the quantum service 102, each of which represents a different developmental stage and/or an alternate implementation of the quantum service 102. Each of these multiple versions of the quantum service 102 is defined by one of a corresponding plurality of quantum service definitions (captioned "DEF" in FIG. 3) 104(0)-104(D).

The quantum computing device 96 of FIG. 3 implements a QTS 106 for performing comparative testing of different versions of the quantum service 102. In exemplary operation, the QTS 106 receives a request 108 from a requestor 110, wherein the request 108 comprises an identifier 112 of the quantum service 102. Upon receiving the request 108, the QTS 106 retrieves the plurality of quantum service definitions 104(0)-104(D) corresponding to a plurality of different versions of the quantum service 102. The QTS 106 then instantiates a plurality of instances 114(0)-114(X) of the quantum service 102 for parallel execution by the quantum computing device 96. Each of the plurality of instances 114(0)-114(X) is defined by a corresponding quantum service definition of the plurality of quantum service definitions 104(0)-104(D) retrieved by the QTS 106. After instantiating the plurality of instances 114(0)-114(X) of the quantum service 102, the QTS 106 performs testing of each instance of the plurality of instances 114(0)-114(X), based on the request 108. Once testing is concluded, the QTS 106 generates a testing result report 116 based on the testing.

Figure 4:
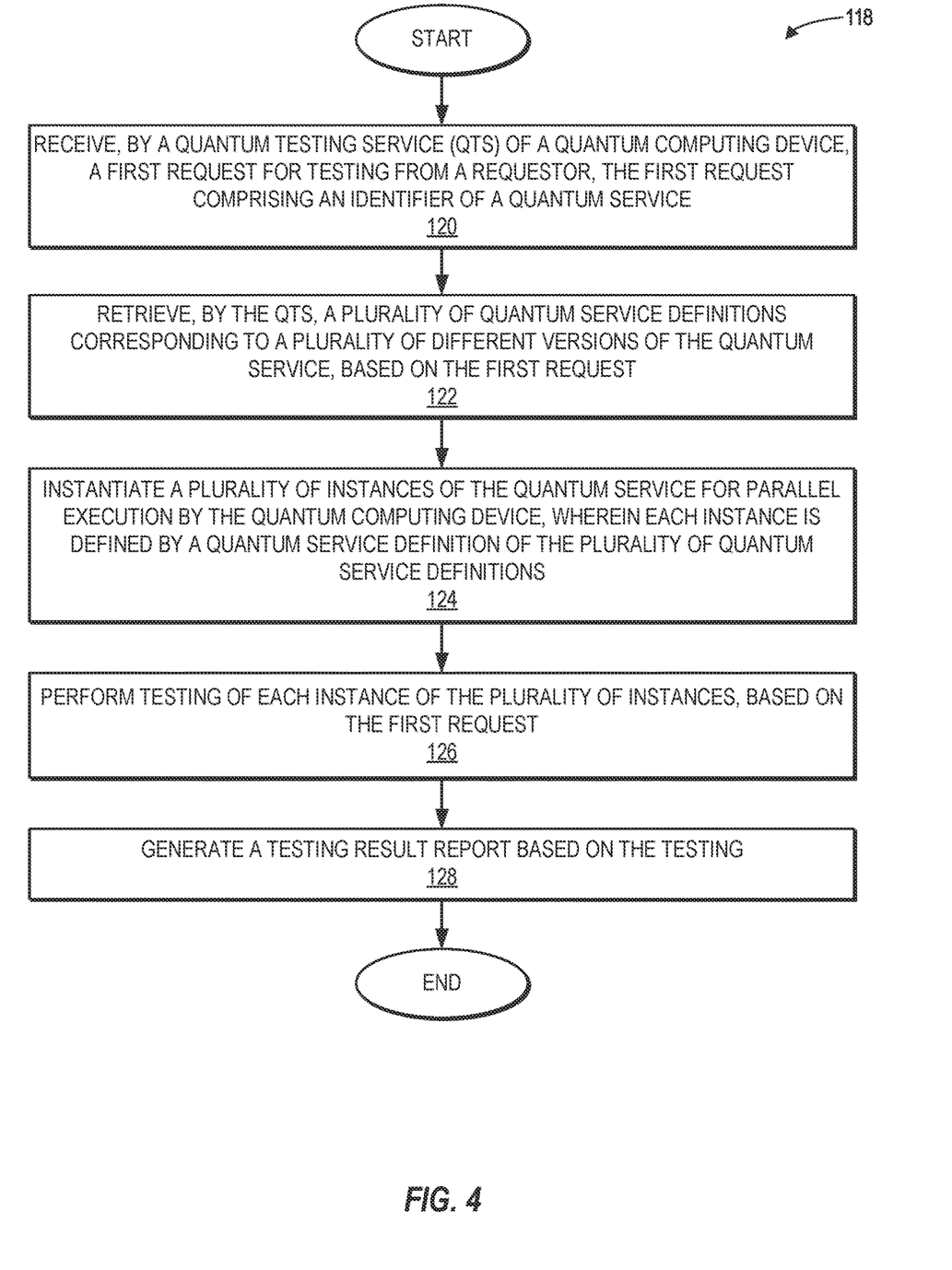
FIG. 4 is a flowchart of a simplified method for performing comparative testing of quantum services in the quantum computing device of FIG. 3, according to one example.

FIG. 4 provides a flowchart 118 of a simplified method for performing comparative testing of quantum services in the quantum computing system 94 of FIG. 3, according to one example. For the sake of clarity, elements of FIG. 3 are referenced in describing FIG. 4. Operations in FIG. 4 begin with the processor device 100 of the quantum computing device 96 receiving (e.g., by executing the QTS 106), a first request for testing (e.g., the request 108 of FIG. 3) from a requestor (such as the requestor 110 of FIG. 3), the first request 108 comprising the identifier 112 of the quantum service 102 (block 120). The QTS 106 retrieves the plurality of quantum service definitions 104(0)-104(D) corresponding to a plurality of different versions of the quantum service 102, based on the first request 108 (block 122).

The QTS 106 next instantiates the plurality of instances 114(0)-114(X) of the quantum service 102 for parallel execution by the quantum computing device 96, wherein each instance is defined by a quantum service definition of the plurality of quantum service definitions 104(0)-104(D) (block 124). The QTS 106 then performs testing of each instance of the plurality of instances 114(0)-114(X), based on the first request 108 (block 126). Finally, the QTS 106 generates a testing result report 116 based on the testing (block 128).

Figure 5:
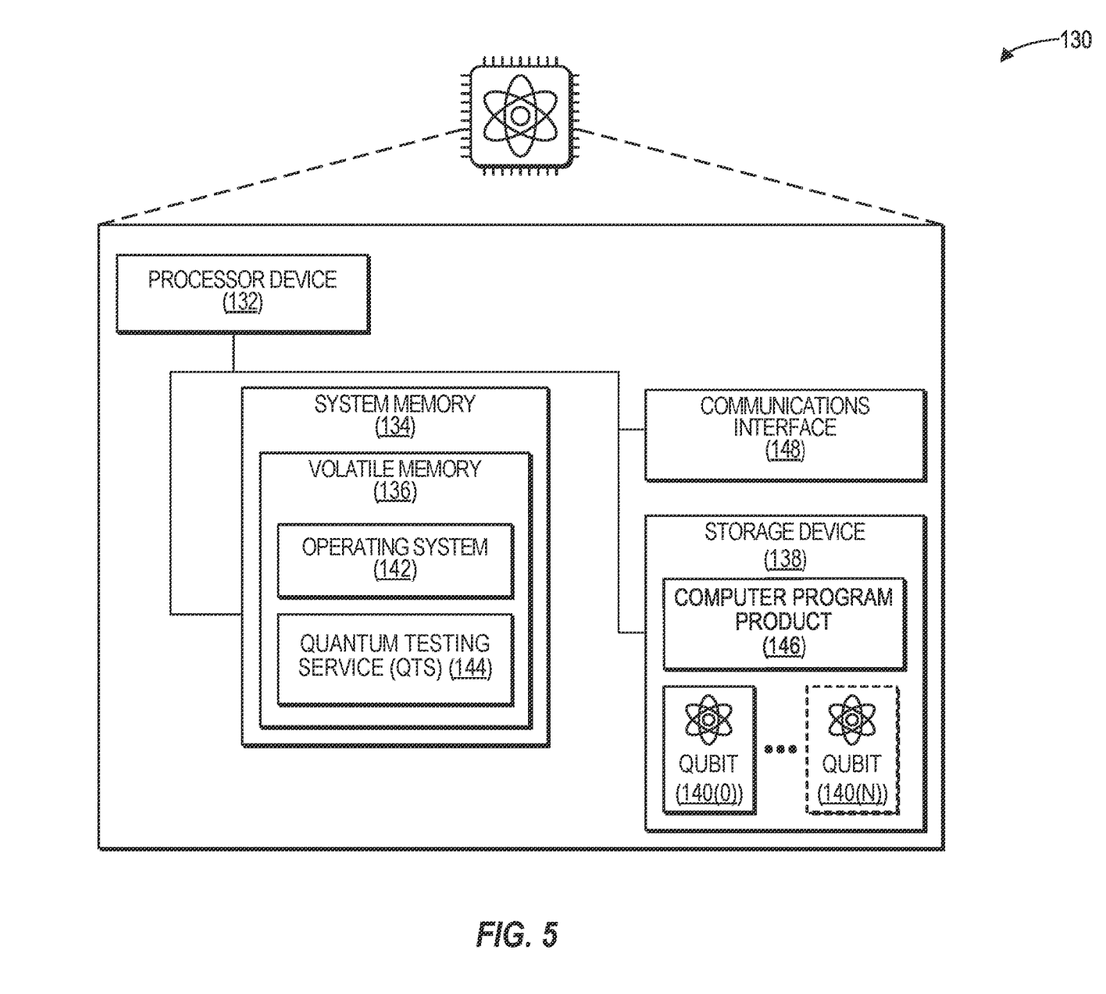
FIG. 5 is a block diagram of a quantum computing device suitable for implementing examples, according to one example.

FIG. 5 is a block diagram of a quantum computing device 130, such as the quantum computing device 12 of FIG. 1, suitable for implementing examples according to one example. The quantum computing device 130 may comprise any suitable quantum computing device or devices. The quantum computing device 130 can operate using classical computing principles or quantum computing principles. When using quantum computing principles, the quantum computing device 130 performs computations that utilize quantum-mechanical phenomena, such as superposition and entanglement. The quantum computing device 130 may operate under certain environmental conditions, such as at or near zero degrees (0°) Kelvin. When using classical computing principles, the quantum computing device 130 utilizes binary digits that have a value of either zero (0) or one (1).

The quantum computing device 130 includes a processor device 132 and a system memory 134. The processor device 132 can be any commercially available or proprietary processor suitable for operating in a quantum environment. The system memory 134 may include volatile memory 136 (e.g., random-access memory (RAM)). The quantum computing device 130 may further include or be coupled to a non-transitory computer-readable medium such as a storage device 138. The storage device 138 and other drives associated with computer-readable media and computer-usable media may provide non-volatile storage of data, data structures, computer-executable instructions, and the like. The storage device may also provide functionality for storing one or more qubits 140(0)-140(N).

A number of modules can be stored in the storage device 138 and in the volatile memory 136, including an operating system 142 and one or more modules, such as a QTS 144. All or a portion of the examples may be implemented as a computer program product 146 stored on a transitory or non-transitory computer-usable or computer-readable medium, such as the storage device 138, which includes complex programming instructions, such as complex computer-readable program code, to cause the processor device 132 to carry out the steps described herein. Thus, the computer-readable program code can comprise computer-executable instructions for implementing the functionality of the examples described herein when executed on the processor device 132.

An operator may also be able to enter one or more configuration commands through a keyboard (not illustrated), a pointing device such as a mouse (not illustrated), or a touch-sensitive surface such as a display device (not illustrated). The quantum computing device 130 may also include a communications interface 148 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:
   receiving, by a quantum computing device, a first request for testing from a requestor, wherein the first request comprises an identifier of a quantum service;
   retrieving, by the quantum computing device, a plurality of quantum service definitions corresponding to a plurality of different versions of the quantum service, based on the first request;
   instantiating a plurality of instances of the quantum service for parallel execution by the quantum computing device, wherein each instance is defined by a quantum service definition of the plurality of quantum service definitions;
   performing testing of each instance of the plurality of instances, based on the first request; and
   generating a testing result report based on the testing.

2. The method of claim 1, wherein the first request comprises one or more of a retrieval indicator that indicates a count of the plurality of quantum service definitions to retrieve, a testing parameter, a load balancing parameter, and a performance metric indicator that indicates a performance metric to include in the testing result report.

3. The method of claim 1, further comprising, prior to instantiating the plurality of instances of the quantum service:
   determining, by the quantum computing device, a number of instances of the quantum service that the quantum computing device is capable of instantiating, based on the plurality of quantum service definitions; and
   transmitting, to the requestor, a response comprising an indication of the number of instances of the quantum service that the quantum computing device is capable of instantiating.

4. The method of claim 3, further comprising receiving, from the requestor, a second request comprising an instance indicator that indicates a count of instances of the quantum service to instantiate, based on the response.

5. The method of claim 3, wherein determining the number of instances that the quantum computing device is capable of instantiating is based on one or more of available hardware resources of the quantum computing device and a count of available qubits of the quantum computing device.

6. The method of claim 1, wherein performing testing of each instance of the plurality of instances comprises:
   receiving a plurality of test requests directed to the quantum service;
   forwarding each test request of the plurality of test requests to an instance of the plurality of instances; and obtaining a measurement of a performance metric of the instance.

7. The method of claim 1, wherein performing testing of each instance of the plurality of instances comprises:
generating, by the quantum computing device, a plurality of test requests directed to the quantum service;
forwarding each test request of the plurality of test requests to an instance of the plurality of instances; and
obtaining a measurement of a performance metric of the instance.

8. The method of claim 1, further comprising transmitting the testing result report to the requestor.

9. The method of claim 1, wherein each quantum service definition of the plurality of quantum service definitions comprises a Quantum Assembly Language (QASM) file.

10. A computing system, comprising:
a quantum computing device, comprising:
a system memory; and
a processor device coupled to the system memory, the processor device to:
receive a first request for testing from a requestor, wherein the first request comprises an identifier of a quantum service;
retrieve a plurality of quantum service definitions corresponding to a plurality of different versions of the quantum service, based on the first request;
instantiate a plurality of instances of the quantum service for parallel execution by the quantum computing device, wherein each instance is defined by a quantum service definition of the plurality of quantum service definitions;
perform testing of each instance of the plurality of instances, based on the first request; and
generate a testing result report based on the testing.

11. The computing system of claim 10, wherein the first request comprises one or more of a retrieval indicator that indicates a count of the plurality of quantum service definitions to retrieve, a testing parameter, a load balancing parameter, and a performance metric indicator that indicates a performance metric to include in the testing result report.

12. The computing system of claim 10, wherein the processor device is further to, prior to instantiating the plurality of instances of the quantum service:
determine a number of instances of the quantum service that the quantum computing device is capable of instantiating, based on the plurality of quantum service definitions; and
transmit, to the requestor, a response comprising an indication of the number of instances of the quantum service that the quantum computing device is capable of instantiating.

13. The computing system of claim 12, wherein the processor device is further to receive, from the requestor, a second request comprising an instance indicator that indicates a count of instances of the quantum service to instantiate, based on the response.

14. The computing system of claim 12, wherein to determine the number of instances that the quantum computing device is capable of instantiating is to determine the number of instances based on one or more of available hardware resources of the quantum computing device and a count of available qubits of the quantum computing device.

15. The computing system of claim 10, wherein to perform testing of each instance of the plurality of instances is to:
receive a plurality of test requests directed to the quantum service;
forward each test request of the plurality of test requests to an instance of the plurality of instances; and
obtain a measurement of a performance metric of the instance.

16. The computing system of claim 10, wherein to perform testing of each instance of the plurality of instances is to:
generate by the processor device, a plurality of test requests directed to the quantum service;
forward each test request of the plurality of test requests to an instance of the plurality of instances; and
obtain a measurement of a performance metric of the instance.

17. The computing system of claim 10, wherein the processor device is further to transmit the testing result report to the requestor.

18. The computing system of claim 10, wherein each quantum service definition of the plurality of quantum service definitions comprises a Quantum Assembly Language (QASM) file.

19. A non-transitory computer-readable medium having stored thereon computer-executable instructions that, when executed, cause one or more processor devices to:
receive a first request for testing from a requestor, wherein the first request comprises an identifier of a quantum service;
retrieve a plurality of quantum service definitions corresponding to a plurality of different versions of the quantum service, based on the first request;
instantiate a plurality of instances of the quantum service for parallel execution by a quantum computing device, wherein each instance is defined by a quantum service definition of the plurality of quantum service definitions;
perform testing of each instance of the plurality of instances, based on the first request; and
generate a testing result report based on the testing.

20. The non-transitory computer-readable medium of claim 19, wherein the computer-executable instructions further cause the one or more processor devices to transmit the testing result report to the requestor.

* * * * *